United States Patent [19]

Maibach

[11] Patent Number: 4,890,577
[45] Date of Patent: Jan. 2, 1990

[54] ANIMAL FEED DISTRIBUTION DEVICE
[75] Inventor: Bruce A. Maibach, Sterling, Ohio
[73] Assignee: W. G. Dairy Supply, Inc., Ohio
[21] Appl. No.: 194,928
[22] Filed: May 17, 1988
[51] Int. Cl.⁴ .............................................. A01K 39/00
[52] U.S. Cl. ................................................... 119/52.1
[58] Field of Search ................ 119/51 R, 52 R, 52 AF

[56] References Cited

U.S. PATENT DOCUMENTS 4,712,511 12/1987 Zamzow et al. .......... 119/52 AF X

Primary Examiner—Gene Mancene
Assistant Examiner—R. Thomas Price
Attorney, Agent, or Firm—Oldham & Oldham

[57] ABSTRACT

An animal feed distribution device that includes a feed conveyor system which fills animal feeding station feed supply bins from central storage. The bins are connected in parallel to the conveyor system, and they receive feed from the system in sequence. At least the last bin designed to receive feed contains an end-looking, infra-red emitting diode component, and a counterpart photo-transistor sensor component, the components providing input information to an electrical control system circuit as the result of the interruption or non-interruption of an infra-red beam passing between the components. The control system circuit activates or deactivates the conveyor system in response to such interruption or noninterruption, which occurs as a conseqence of the feed level in the bin. Both sensor components are mounted opposite each other so as to extend inwardly for a minimum distance from the interior of the bin walls. The system control circuit includes a first delay circuit that prevents generation of a control signal for a predetermined period of time following an interruption of the beam, a second delay circuit that delays generation of a control signal for a predetermined period of time after commencement of beam transmission, and a third delay circuit which limits the duration of a control signal resulting from the beam transmission.

7 Claims, 3 Drawing Sheets

ANIMAL FEED DISTRIBUTION DEVICE

TECHNICAL FIELD

This invention relates to a device for automatically providing feed for farm animals, especially cows. More particularly, this invention relates to a device for controlling the delivery of animal feed to animal feeding stations in order to assure that adequate feed is always availabe at the stations for animals feeding therefrom. Specifically, this invention relates to the use of a conveyor network which includes self-cleaning sensors mounted therein which activate the conveyor network, causing it to transfer feed from the storage area to feeding station hoppers, as required so as to replace feed removed therefrom by the animals. The sensor-containing circuit includes a delay function capable of distinguishing a passing stream of moving feed from a static column of feed, thereby allowing detection of a full-hopper condition. The sensor circuit also contains two additional delay functions, the first of which prevents activation of the conveyor for a predetermined period of time after detection of an empty station hopper condition, eliminating excessive system cycling, while a second delay function stops the conveyor after a predetermined period of running time to prevent the conveyor network from continuing to run even through the feed available to the network from the primary supply has been exhausted or feed blockage has occurred, or though feed spillage has resulted from a malfunction of the system.

BACKGROUND OF THE INVENTION

The economic pressures being experienced in the agricultural field as a result of rising costs that cannot be recovered through increased selling prices have led those charged with the responsibility of running farming operations to seek methods for curtailing expenses to the extent possible. The pressure to control costs has given rise to attempts to increase the degree to which framing operations can be automated so as to reduce labor costs. In the area of animal husbandry, for example in dairy farming, there has been an extensive effort to increase the number of animals that can be cared for by an individual, through the use of automated milking devices, feed-conveying systems, and similar expedients. Also with respect to dairy farming, extensive effort has been devoted to increasing revenues by maximizing milk production, among other things, by making sure that the animals have an ample supply of food available for their use at all times.

In the past, a variety of systems have been used to automatically distribute feed to milk cows. Such systems typically involve conveyor systems for moving feed from a storage area to some type of feeding trough accessible to the cows. In some case, the systems include ways in which to detect the availability of feed to the animals, and to activate or inactivate the transfer system, depending on the nature of the information supplied by the detector.

One such system depends upon a spring-positioned, pivotable paddle mounted in the feed station supply hopper. When the paddle is positioned by its spring in an extended position away from an associated switch, the switch is free to activate a feed-supply auger until the hopper fills to the point at which the weight of the feed forces the paddle to oppose the force of the spring, folding the paddle back against the hopper wall where it contacts and throws the switch, turning off the supply auger. When the feed drops below the level of the paddle, the latter is again forced by its spring away from the switch, reactivating the auger. While the system is simple in concept, it suffers from the fact that the feed in the hopper has a tendency to accumulate behind the paddle with the passage of time, eventually, preventing pivoting of the paddle, and therefore, its contact with the switch.

Another system sometimes used depends upon feed detection by a photoelectric cell positioned in a translucent section of the feed hopper. When feed within the hopper drops below the level of the cell, the feed auger is activated, causing feed to flow into the hopper until the feed level rises to the point at which it can be detected by the cell, resulting in deactivation of the auger. Among other things, however, the system suffers from the fact that adventitious light has a tendency to enter the translucent section from above and below the photocell, producing the false readings, thus interfering with proper functioning of the cell. In addition, the light source on which the photocell depends has a relatively high failure rate, rendering the system inoperable until a light source problem is noted and corrected.

Systems have also been developed which depend on light emitting diodes, and counterpart detectors, mounted essentially flush in the wall of the feed hopper system, which detect the presence or absence of feed in the hopper. However, the flush-mounted LED detectors have a tendency to be covered and, therefore, "blinded" by the accumulation of feed along the wall on which the detectors are mounted, resulting in failure of the system.

DISCLOSURE OF THE INVENTION

In view of the foregoing, therefore, it is the first aspect of this invention to provide an animal feed distribution device which furnishes feed to animal feed station supply hoppers, automatically, on an "as-needed" basis.

A second aspect of this invention is to provide an animal feed distribution device which employs feed detection means that are self-cleaning, and therefore, detection means that are not susceptible to being blinded by adhering feed.

Another aspect of this invention is to furnish detection means for an animal feed distribution device which is able to distinguish between a stream of feed moving past such means, and a quantity of static feed.

A further aspect of the invention is to provide an animal feed detection device which does not cycle at an objectionable rate between an activated, and an inactivated state.

An additional aspect of this invention is the provision of an animal detection device that is able to recognize an abnormal condition, and upon such recognition, to shut itself off until the abnormality is corrected.

Another aspect of this invention is to provide an animal feed detection device which is unaffected from undesirable increases in voltage of the type which would interfere with its proper functioning, and which occur from time-to-time in the power supply to the device.

The foregoing and other aspects of this invention are provided by an animal feed distribution device comprising:

at least one animal feeding station feed storage bin;
a feed conveyor system for filling said bin;

at least one feed detection means, and an electrical control system circuit, wherein said feed detection means comprises an end-looking infra-red emitting diode, and an end-looking photo-transistor sensor, said detection means being mounted in said storage bin, and wherein, said electrical control system circuit is designed to control activation of said conveyor system based on signals caused by said detection means, and wherein further, said electrical control system circuit includes a first delay circuit which prevents the interruption of an infra-red beam transmitted by said detection means from causing a control signal capable of deactivating said feed conveyor system as a consequence of said interruption for a predetermined period of time following said interruption, a second delay circuit which delays a control signal caused by transmission of an uninterrupted infra-red beam by said detection means from activating said conveyor system for a predetermined period of time after commencement of its uninterrupted transmission, and a third delay circuit which limits the period of time during which a control signal caused by commencement of the transmission of an uninterrupted infra-red beam by said detection means can activate said conveyor system.

The foregoing and additional aspects of the invention are provided by a control device comprising in combination:

detection means, and an electrical control system circuit, said detection means being electrically connected to said electrical control system circuit, wherein said detection means comprises an end-looking, infra-red emitting diode, together with an end-looking, photo-transistor sensor, said diode being designed to transmit an infra-red beam to said sensor, and wherein said electronic control system circuit receives electronic information from said detection means as to whether said beam has been interrupted by an object passing between said diode and said sensor, and wherein further, said electrical control system circuit generates an electronic control signal in response to said information, in which, however, said electrical control systems circuit includes a first delay circuit that prevents a generation of a controlling signal for a predetermined period of time following an interruption of said transmission of said beam, and a second delay circuit that delays the generation of a controlling signal for a predetermined period of time after commencement of the uninterrupted transmission of said beam, and a third delay circuit which limits the duration of a controlling signal resulting from said uninterrupted transmission of said beam.

BRIEF DESCRIPTION OF THE DRAWINGS

The invention will be better understood when reference is had to the following drawings, in which like numbers refer to like parts, and wherein.

DETAILED DESCRIPTION OF THE INVENTION

Figure 1:
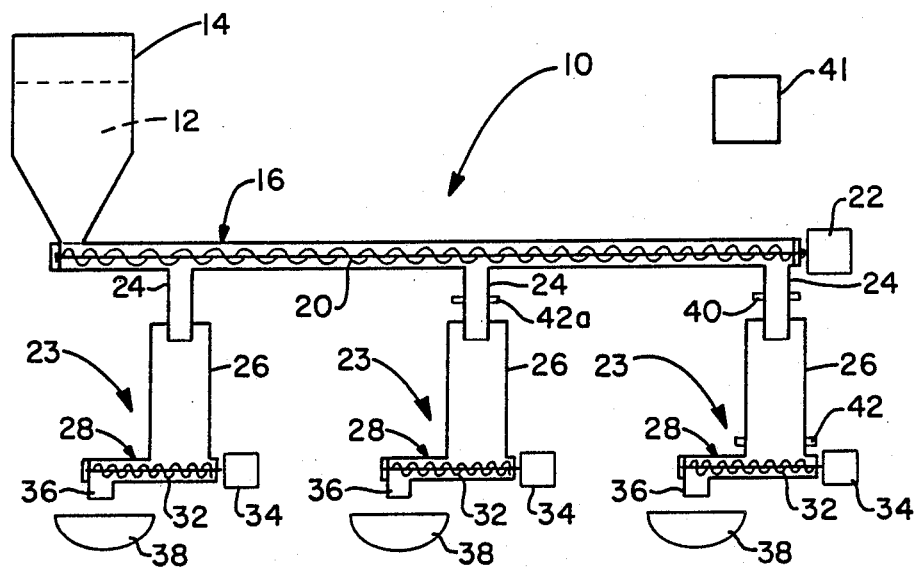
FIG. 1 is a semi-schematic representation of an animal feeding system utilizing the animal feed distribution device of the invention.

FIG. 1 shows a semi-schematic representation of an animal feeding system utilizing the animal feed distribution device, generally 10, of the invention. In the Figure, animal feed 12 is contained in a feed storage bin 14 which supplies the feed to a primary screw conveyor, generally 16. The screw, or auger, 20, operated by electric motor 22, propels the feed within the conveyor to discharge conduits 24 which supply the feed to feed station storage bins 26. The discharge conduit 24 is mounted thereon a feed sensor 40 which controls operation of the auger 20, activating the auger when the feed level drops below the sensor, and inactivating it when it reaches the sensor. Feed is removed from the feed station storage bins by a feed station screw conveyor, generally 28, operated by an electric motor 34, discharging the feed from spout 36 into the feed pan 38.

While other systems of operation are possible, animals such as dairy cows being fed by the device wear an encoded tag which functions as a transponder, worn about the neck of the animal. As the animal approaches the feed pan 38, the transponder operates in cooperation with a detector-transponder activator device, not shown, mounted in the vicinity of the feed pan, the latter detecting the presence of an identity of the animal at the feeder, supplying such information to a computer, also not shown. Based on the information received, the computer activates the conveyor 28, supplying feed to the animal based on stored information as to the animal's nutritional requirements. As the level in the feed station storage bin system, a term which includes both bin 26 and discharge conduit 24, or other similar feed station storage bin systems, the depletion is detected by sensor 40, and the feed is replaced in the system as previously described.

Ordinarily, the feed distributor bin comprises a series of feeding stations, generally 23, located in a "cow-parlor" or barn, designed to accommodate the feeding of a number of animals simultaneously. Where more than one feeding station 23 is connected to the feed distributor 10, the feeding stations' storage bins will be connected in parallel to the conveyor, the feed level sensor 40 being located in the bin system last serviced by the conveyor, in other words, the bin system at the end of the conveyor as shown in FIG. 1. With such a feed station arrangement, the conveyor 16 will fill the stations in sequence, that is, feed will first be deposited in the first station storage bin, and when it is full, the feed will automatically proceed to the next bin until it is full, and so forth, until the last bin is reached, and the feed level rises to the point where sensor 40 is activated.

However, since the animals are free to feed at any of the stations, it sometimes happens that for one reason or another, the animals will tend to avoid feeding at the station containing the feed level sensor 40. In such case, that station will tend to remain full, even though preceding stations have been emptied. When this occurs, the problem can be corrected by locating a sensor 42a in the feed station bin next preceding the station discriminated against, while locating a second sensor at a location low enough in the unpopular station bin to accommodate the amount of feed contained in a conveyor system between the less popular feeding station, and the preceding station. In a system so modified, the conveyor 16 is activated when either sensor 42a or 40 detects an empty bin condition, and will not shut off until both such sensors signal the full condition. Sensor 40 is placed in the lower position so that room will be left in its bin system to accommodate the feed in the conveyor section between it and the preceding feeding station so that such feed will not encounter a full bin in the less popular station, which could result in damage to the feed conveyor device. Other variations of sensor placement are easily made, depending upon the circumstances.

In order to avoid rapid on and off cycling of the conveyor 16 as the level drops below the detection level of the feed sensors, which operate in association with an electrical control system circuit, for example, in housing 41, a delay circuit is incorporated in the control circuit which allows a time interval selected by the operator of the device to elapse between detection of an empty bin condition and the time at which the conveyor 16 is activated. In the absence of such delay capability, the sensor 40 would tend to activate the conveyor 16 at such frequent intervals that overheating and other damage to the system could occur.

Also incorporated into the control circuit is a delay circuit which acts to limit the duration of the period of continuous operation of the conveyor 16. Such a delay will normally be no longer than that required to completely fill a feed station bin, once the conveyor device has been activated. Such a delay protects against the possibility that a rupture will occur somewhere in the system, creating the risk of an attempt by the device to replenish a station bin, notwithstanding the fact the feed may be failing to fill the bin due to its escape through the rupture, and from the possibility that the primary feed supply has been exhausted or blocked. The protection provided prevents the device from completely emptying the feed storage bin 14 through the rupture, an error which might otherwise occur.

While FIG. 1 demonstrates the use of an enclosed screw conveyor, different types of conveyor might also be used, for example, an unenclosed conveyor, a belt conveyor, gravity feed controlled by a valve, air conveying systems, or others.

Figure 2:
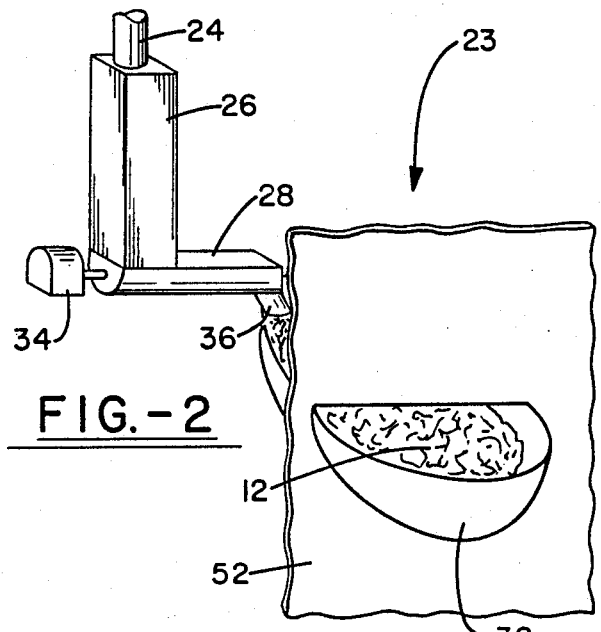
FIG. 2 is an isometric partial view of an animal feeding station of the type which the feed distribution of the invention is employed.

FIG. 2 is an isometric partial view of an animal feeding station 23 of the type with which the feed distribution is employed. As shown, the feeding station, which may be altered to suit the convenience of the user, includes a feed pan 38, containing feed 12, mounted in a partition wall 52. Behind the partition 52 is located the feed station storage bin system 26 which supplies the feed pan 38 through the feed station's screw conveyor 28, feed discharging through spout 36 located over the feed pan. The feed pan 38 is shaped so that feed deposited behind the partition 52 flows forward past the partition to a point where it is accessible to an animal feeding from the pan. Normally, the bin 26 and the conveyor 28 will be supported independently from the partition and feed pan to prevent damage to the device which might otherwise result from impact of the animals during feeding with the pan and the partition.

Figure 3:
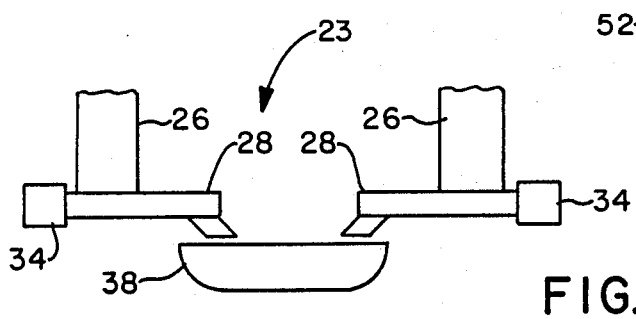
FIG. 3 is a semi-schematic partial view of an animal feeding station services by two feed hoppers.

FIG. 3 is a semi-schematic partial view of an animal feeding station 23 illustrating that a feed pan 38 may be filled from 2, or more, feed station bins 26, with associated conveyors 28. Such expedient is particularly useful when the feed dispensed to the animal is required to contain multiple dietary components. When more than one feed station bin 26 is employed, as illustrated, it will normally be necessary to have an equivalent number of the other components of the feed distributor device associated therewith.

Figure 4:
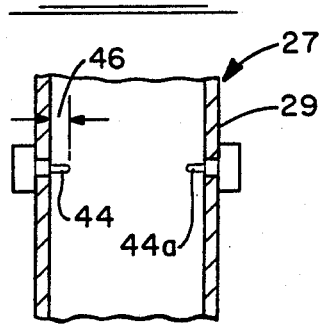
FIG. 4 is a section view of an animal feed hopper in which detection means mounted as disclosed by the invention is shown.

FIG. 4 shows a section view of an animal feed bin system, generally 27, comprising a bin wall 29 in which are mounted the components of a feed level sensor. The feed lever sensor comprises an infra-red light emitting diode 44, and transistorized sensor 44a, associated therewith. As previously describe, LED's employed in such service have a tendency to become inoperable over time, as a result of feed accumulations which adhere to the bin wall, and which eventually tend to cover over the components of the sensor, preventing emission of the infra-red beam from the diode 44, or its detection by the sensor 44a, or both. In the instant invention, the problem has been overcome by a stratagem which employs a particular positioning of the sensor components, relative to the bin wall 29, and the use of a particular type of LED, specifically, it has been found that the use of "end-looking" sensors when properly positioned, eliminates the problem. While similar sensors may be used, particularly good results have been obtained with an end-looking sensor employing a plastic, infra-red emitting diode with about a 15 degree high output emission angle, operating in conjunction with an end-looking, lensed, clear plastic photo-transistor having an angle of about 8 degrees from its optical axis to its one-half power point. Such end-looking sensors, for example are marketed by the Opto Electronics Division of TRW's Electronic Component Group of Carrollton, Tex. As suggested, such sensors, which are generally cylindrical in shape, primarily transmit and receive the infra-red signal on which their operation depends through their exposed ends. Consequently, the accumulation of feed on their sides, which inevitably occurs due to their horizontal positioning, is incapable of interfering with the signal transferred between the ends of the sensor component.

While even the end-looking sensor described is susceptible to blinding from wall feed accumulations, it has been found that when the sensor components are mounted so that they extend at least about one-quarter to one-half inch from the bin wall, they tend to be "self-cleaning". In other words, not only are wall feed accumulations prevented from building out to the tip of the components where they could conceivably extend over the tip of, and blind the components, but in addition, due to the cleansing action caused by the impact of feed falling on and past the components, disabling accumulations of feed on the sensor components themselves are avoided.

Infra-red beams have also been found to provide exceptional penetration of the dusty conditions prevalent within the bins, and the use of infra-red sensor is, therefore, strongly preferred.

While the sensor device described functions by generating a signal upon transmission of an uninterrupted infra-red beam between the components of the sensor, information useful to the control circuit can comprise either the presence or absence of an electrical impulse thus generated. Accordingly, as used herein, the use of the word "signal" or "electronic information" refers to either the presence or to the absence of such an impulse, as the case may be.

Figure 5:
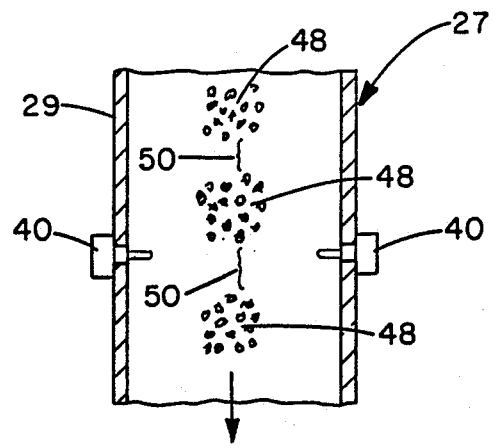
FIG. 5 is a semi-schematic view of an animal feed hopper in which the fluctuating pattern of feed passing the detection means is represented.

FIG. 5 is a semi-schematic view of an animal feed bin system 27 showing a sensor 40 mounted in a bin wall 29. As illustrated, feed is shown falling past the sensor in the direction of the associated arrow. While a falling stream may appear to an observer to consist of a solid stream of particles, in fact, the stream is made up of a series of feed particles, or groups of particles 48 which have interspersed therebetween voids 50 which allow intermittent transmission of an infra-red beam between the components of a sensor 40. This nonuniformity, coupled with provision of a delay circuit in the control circuit of the feed distribution device, provides one of the important elements of the invention. By way of explanation, were it not for such nonuniformity, the infra-red beam would not be able to penetrate the stream of feed, causing the control circuit to operate as if a bin-full condition existed. When, however, activation of the control circuit is delayed for a period of time sufficient for the beam interrupted by a group of falling particles 48 to encounter a beam penetrable void 50, the control circuit functions as though the beam had never been uninterrupted, continuing to indicate a bin-empty condition. This allows the supply of feed to the bin to continue until the level rises to the level of the sensor 40, indicating the presence of a static quantity of feed opposite of the sensor, and therefore, a bin-full condition. In effect, therefore, the delay provides a "memory function" for the circuit, allowing it only to remember an interrupted beam while moving feed is passing. While the period of delay will be depend upon the geometry of the bin, the type of feed involved, and the dimensions of the falling stream, it has been found that provision of a delay in the order from about one-quarter to one-half second will allow the unimpeded filling of the bin. Particularly good results are obtained, however, with a delay of about one-third second.

Figure 6:
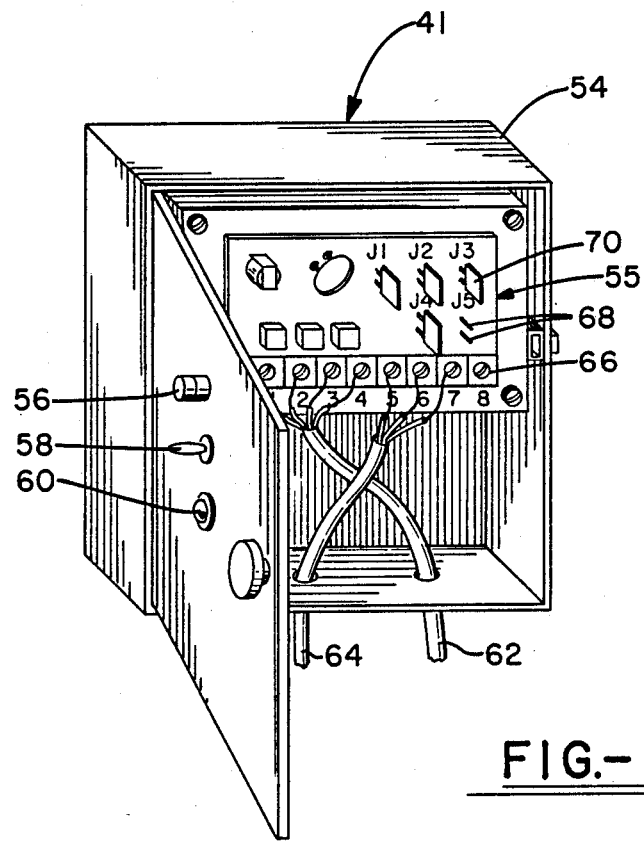
FIG. 6 is an isometric view of the box which houses the electrical control system circuit of the invention.

FIG. 6 is an isometric view of a box suitable for housing the electrical control system circuit of the invention. As shown, the control box, generally 41, comprises a dust proof housing 54 containing control circuity, typically mounted on a circuit board, generally 55. The circuitry advantageously includes provision for a fuse 56; a temporary bypass 58, which allows the device to be manually operated; and a reset device 60. A power supply cable 62, normally carrying 120 volts, is secured to some of the circuit terminals as shown, while connection from the feed sensor is made to others of the terminals by means of wires contained in the sensor cable 64.

Although other systems might be employed, for example, a multi-position switch, FIG. 6 illustrates the use, for example, a delay connector "caps" 70, which slide on or off pins 68, serving to connect the pins, and activating the circuit connected thereto. The length of the delays described in the preceding can, therefore, be programmed to whether value is desired simply by slipping the caps on or off various ones of such pins, activating appropriate circuits. The delay circuits can be based upon any of the mechanisms will known in the art, for instance, those which depend upon a delay provided by capacitors.

Figure 7:
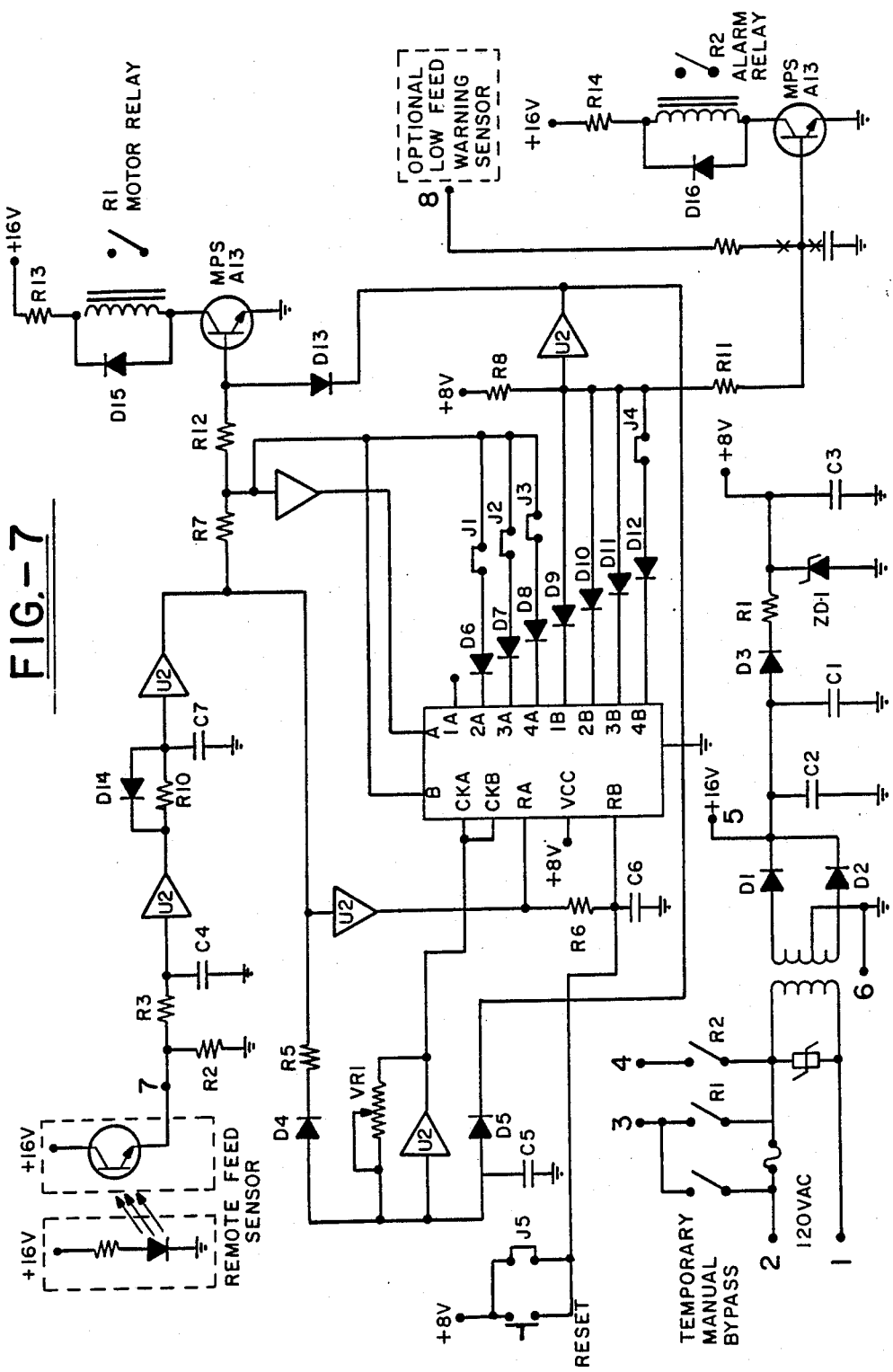
FIG. 7 is a circuit diagram of the electrical control system circuit of the invention.

FIG. 7 is a circuit diagram of an electrical control system circuit of the invention. Any of a variety of circuits can be employed to accomplish the functions of the device described in the preceding, and optional functions. For example, a circuit can include provision for activation of alarm signals, as for instance, in the case of conveyor operation inactivation caused by operation of the conveyor for a period of time which exceeds a predetermined period of time, as in the case of a system rupture, which causes a conveyor limiting delay to be activated.

Rural wiring is particularly prone to sudden, uncontrolled increases or "spikes" of voltage, for example, when the power distribution network experiences a lightning strike. For this reason, and since such spikes can interfere with the proper functioning of the delay circuits, the provision of a voltage limiting circuit within the control system circuit is particularly desirable. Such protection may be of a type which results in the shorting out of current having greater than a predetermined voltage.

While in accordance with the patent statutes, a preferred embodiment and best mode has been presented, the scope of the invention is not limited thereto, but rather is measued by the scope of the attached claims.

What is claimed is:

1. An animal feed distribution device comprising:
   at least one animal feeding station feed storage bin;
   a feed conveyor system for filling said feed storage bin;
   at least one feed detection means, and
   an electrical control system circuit, wherein said feed detection means comprises an end-looking, infra-red emitting diode, and an end-looking photo-transistor sensor, said detection means being mounted in said storage bin, and wherein, said electrical control circuit is designed to control activation of said conveyor system based on signals caused by said detection means, and wherein further, said electrical control system circuit includes a first delay circuit which prevents the interruption of an infra-red beam transmitted by said detection means from causing a control signal capable of deactivating said feed conveyor system as a consequence of said interruption for a predetermined period of time following said interruption, a second delay circuit which delays a control signal caused by transmission of an uninterrupted infra-red beam by said detection means, from activating said conveyor system for a predetermined period of time after commencement of its uninterrupted transmission, and a third delay circuit which limits the period of time during which a control signal caused by commencement of beam by said detection means can activate said conveyor system.

2. An animal feed distribution device according to claim 1 in which said end-looking, infra-red emitting diode, and said end-looking photo-transistor sensor are mounted opposite each other so that they extend inwardly from the walls of said storage bin for a distance of at least about one-fourth inch.

3. An animal feed distribution device according to claim 1 in which said electrical control system circuit includes means for limiting the magnitude of the effective input power supply voltage available to said control system circuit.

4. An animal feed distribution device according to claim 1 which, however, includes a plurality of said animal feeding station feed storage bins, interconnected and filled in sequence by said feed conveyor system, wherein said feed detection means is located at least in the last of said bins to be filled in a filling sequence.

5. An animal feed distribution device according to claim 4 wherein when more than one feeding station feed storage bin is provided with feed detection means, a feed conveyor system inactivation signal must be received from each of said feed detection means before said feed conveyor system is inactivated.

6. An animal feed distribution device according to claim 1 in which said feed conveyor system is a screw conveyor.

7. An animal feed distribution device according to claim 1 in which at least some delay circuits can be programmed by an operator of said device to provide differing increments of delay time.

* * * * *